(12) United States Patent
Banks

(10) Patent No.: US 6,521,298 B1
(45) Date of Patent: Feb. 18, 2003

(54) PROCESS FOR APPLYING POLYURETHANE TO A SUBSTRATE

(75) Inventor: Eric W. Banks, Smyrna, GA (US)

(73) Assignee: Isotec International, Inc., Canton, GA (US)

( * ) Notice: Subject to any disclaimer, the term of this patent is extended or adjusted under 35 U.S.C. 154(b) by 0 days.

(21) Appl. No.: 10/094,788

(22) Filed: Mar. 11, 2002

Related U.S. Application Data

(60) Provisional application No. 60/274,963, filed on Mar. 12, 2001.

(51) Int. Cl.$^7$ ................................................. B05D 1/02
(52) U.S. Cl. ..................... 427/425; 427/385.5; 427/421
(58) Field of Search ............................. 427/385.5, 421, 427/425

(56) References Cited

U.S. PATENT DOCUMENTS

| | | |
|---|---|---|
| 4,039,516 A | 8/1977 | Niederdellman |
| 4,131,606 A | 12/1978 | Ammons |
| 4,456,744 A | 6/1984 | Kamatani |
| 4,592,947 A | 6/1986 | Hunter |
| 4,663,417 A | 5/1987 | Hunter |
| 4,666,758 A | 5/1987 | Hunter |
| 4,938,825 A | 7/1990 | MacDonald |
| 5,296,544 A | 3/1994 | Heise |
| 5,418,311 A | 5/1995 | Schafer |
| 5,554,686 A | 9/1996 | Frisch |
| 5,733,966 A | 3/1998 | Cline |
| 5,976,304 A | 11/1999 | Horvath |
| 6,103,851 A | 8/2000 | Roser |
| 6,040,028 A1 | 3/2002 | Cline |
| 6,046,295 A1 | 4/2002 | Frisch |

Primary Examiner—Bernard Pianalto

(57) ABSTRACT

The process for applying a polyurethane derived from VOC-free reactants wherein the reactants are polyol resin and isocyanate. The reactants are separately heated, proportioned and pressurized then the proportioned heated reactants are mixed together. The proportionate volume ratio of polyol resin reactant to isocyanate reactant is 1:1.05 to about 1:4. Combining the reactants initializes the formation of the polyurethane with a stoichiometric excess of the isocyanate reactant. The polyurethane reactants are sprayed onto a heated rotating substrate in an amount sufficient to create a polyurethane elastomer reinforcement layer after curing. The polyurethane reactants are polymerize or gel into an elastomer in the time range of 15 to about 120 seconds.

11 Claims, 4 Drawing Sheets

PROCESS FOR APPLYING POLYURETHANE TO A SUBSTRATE

CROSS-REFERENCE TO RELATED APPLICATION

This application claims the benefit of US Provisional Application No. 60/274,963 filed on Mar. 12, 2001 and is incorporated herein by reference.

FIELD OF THE INVENTION

The invention relates, in general, to a process for applying polyurethane. In particular, the invention relates to a process of applying polyurethane to form an elastomer reinforced substrate. More particularly the invention relates to a process of applying polyurethane to manufacture an elastomer reinforced substrate utilizing VOC-free polyurethane reactants.

BACKGROUND OF THE INVENTION

The principal method of manufacturing plastic/acrylic signs, bath tubs, sinks, spas, marine parts and the like consists of forming a thermoplastic substrate with a high surface finish or other types of substrates and attaching a secondary layer(s) by spraying a mixture of fiberglass and polyester resin thereon. The sprayed-on material is then subjected to patting and rolling to smooth down the entrapped fiberglass and remove any air pockets. The substrate is then allowed to cure at ambient temperature to achieve a coated fiberglass and polyester resin reinforced substrate. Various materials such as plywood or cardboard may be attached by further sprayed-on applications of polyester resin and fiberglass to achieve desired substrate geometry or additional support for the substrate.

In the past attempts to implement the above discussed manufacturing process have failed due to Environment Protection Agency (EPA) rules and regulations regarding the emission of styrene into the atmosphere. In the case of polyester resin, styrene is used as a cross-linking agent for unsaturated polyesters. Additionally, styrene appears to help foster good bond strength between the polyester resin and various substrates It is estimated by various industry models that 5–10% of the polyester resin weight is released to the atmosphere in typical manual (FIG. 4.) and spray (FIG. 5) applications. Styrene is a volatile organic compound (VOC) and is a suspected carcinogen as well. The industry is currently under EPA mandates to control styrene emissions.

Some of the hazards of styrene monomer are:

flammable liquid and vapor, may undergo rapid polymerization, harmful or fatal if swallowed—can enter lungs and cause damage causes skin irritation, may cause respiratory tract irritation if inhaled, inhalation may cause central nervous system effects, may cause damage to liver, toxic to aquatic organisms, causes cancer in laboratory animals.

A contributing factor in the failed attempts to implement the above-discussed manufacturing process is the cycle time. The manufacturing time per unit is typically 25–45 minutes. This manufacturing time must elapse before the reinforced part can be trimmed and fitted for with additional fixtures such as water jets, hoses, handles, etc. Shorter cycle times allow for higher production volumes. Yet, another contributing factor is that the heat generated by the exothermic cross-linking reaction can be quite high and cause deformation of thermoplastic substrates. This often makes it necessary to apply multiple thin layers of reinforcement to thin cross-section substrates.

One attempt to resolve the EPA issues consists of forming a thermoplastic substrate with a high surface finish and attaching a reinforcing layer by a reaction injection molding (RIM) process. The thermoplastic substrate is inserted into a matching, closable mold that provides a space for a layer of reinforcing material. The reinforcing material is comprised of a mixture of a polyol and isocyanate and is then injected into the mold space where the mixture reacts therein. This method is a closed-tool technique that specifies the use of a rigid polyurethane foam or a rigid elastomer with a density of 400 to 800 kg/m$^3$ (25 to 50 lbs/ft$^3$) and is typically injected into the closed mold at a pressure of 345 to 690 kPa (50 to 100 psi). The preferred pressures within the mold are about 80 psi.

There are several disadvantages to the close-tool process. The closed-tool molds and related equipment capable of sustaining the pressures of 345–690 kPa are very expensive. Design changes to this type of mold are also very expensive and limited to retooling or replacing the entire mold. It is very difficult, if not impossible, to achieve a laminate substrate with acceptable dimensions that is of similar strength and hardness as the polyester resin and fiberglass combination utilizing polyurethanes with a specified density of 400 to 800 kg/M$^3$.

It would be desirable to have a process for applying an elastomeric coating to a free standing form or substrate such as plastic/acrylic signs, bath tubs, sinks, spas, marine substrates and the like wherein the process does not emit volatile organic chemicals (VOC) such as styrene. The process would allow the elastomeric coating to be applied and cured quickly, to be applied in multiple layers, without the emission of VOC's.

SUMMARY OF THE INVENTION

The present invention provides a process for applying a polyurethane elastomeric coating to a free standing form or substrate such as plastic/acrylic signs, bath tubs, sinks, spas, marine substrates and the like wherein the process does not emit volatile organic chemicals (VOC) such as styrene. It should be noted that the present invention achieved adhesion of the polyurethane elastomer to the acrylic and co-extruded ABS/acrylic substrates without the use of adhesion-promoting additives to the polyol resin reactant or the isocyanate reactant and no primer on the substrate surface. The process would allow the elastomeric coating to be applied and cured quickly and to be applied in multiple layers. The polyurethane of the present invention is a two-part formulation of a polyol resin reactant and an isocyanate reactant. The reactants are separately proportioned, pressurized and heated, then the proportioned heated reactants are mixed together at the time of application. The proportionate volume ratio of isocyanate reactant to polyol resin reactant is 1:1.05 to about 1:4. The combining of the reactants initializes the formation of the polyurethane with a stoichiometric excess of the isocyanate reactant. The proportioned, heated and pressurized polyurethane reactants are mixed and then sprayed onto a heated rotating substrate. The polyurethane reactants are sprayed onto the substrate in an amount sufficient to create, after curing, a polyurethane elastomer reinforcement layer. The polyurethane reaction continues as the reactants are being sprayed onto the top surface of the rotating heated substrate. The polyurethane reactants polymerize or gel into an elastomer in a time range of 15 seconds to about 120 seconds. If desired the above discussed process may be repeated to add a plurality of layers of polyurethane elastomer to the substrate to achieve varying thicknesses of reinforcement of the substrate.

When taken in conjunction with the accompanying drawings and the appended claims, other features and advantages of the present invention become apparent upon reading the following detailed description of embodiments of the invention.

BRIEF DESCRIPTION OF THE DRAWINGS

The invention is illustrated in the drawings in which like reference characters designate the same or similar parts throughout the figures of which.

DETAILED DESCRIPTION OF THE PRESENT INVENTION

Figure 1:
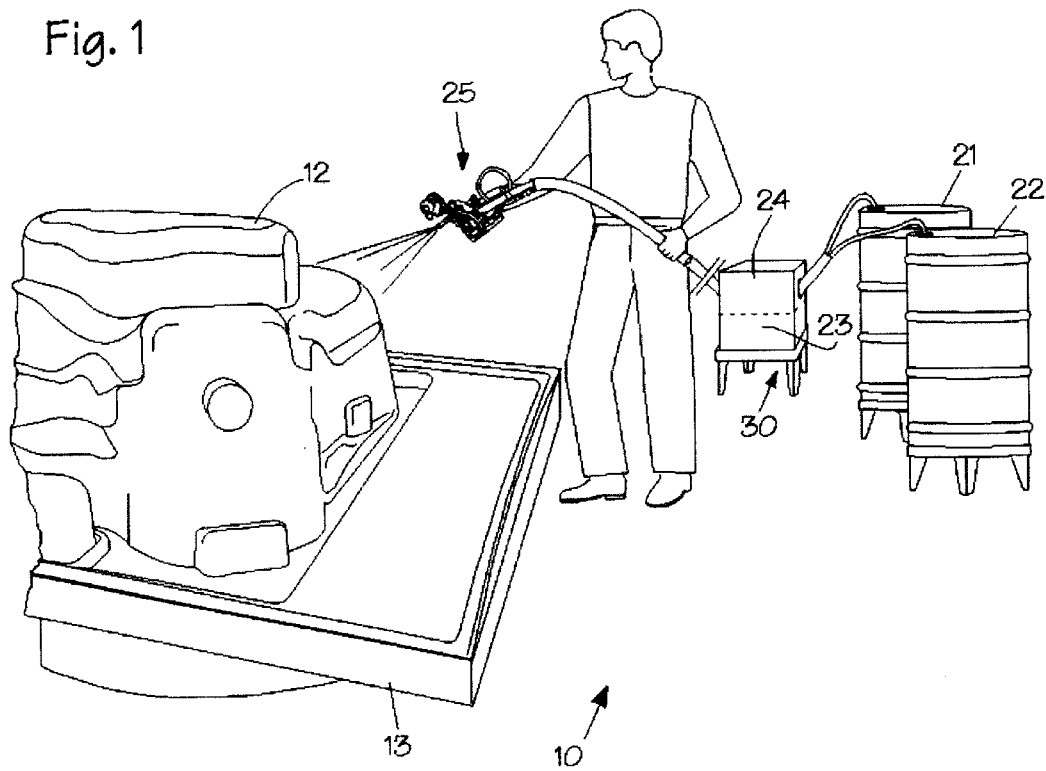
FIG. 1 illustrates a schematic view diagram of an inverted substrate mounted onto a rotating platform.
Figure 2:
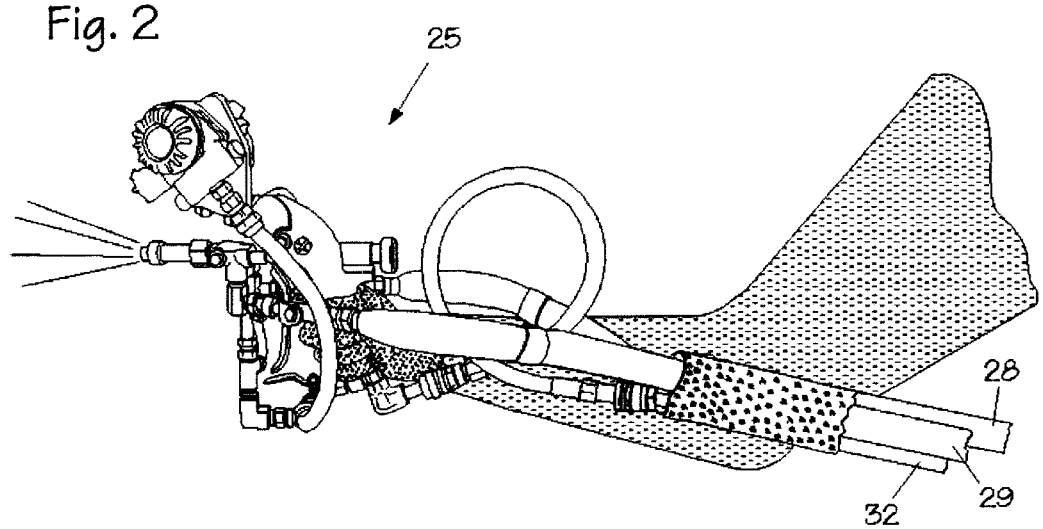
FIG. 2 illustrates a schematic view diagram of a spraying mechanism of FIG. 1.

Before describing in detail the particular process of applying volatile organic chemical (VOC) free polyurethane reactants and the process for manufacture of a reinforced substrate in accordance with the present invention, it should be observed that the invention resides primarily in the novel process combination of a conventional spraying mechanism, substrate and VOC-free polyurethane reactants and not in the particular detailed configuration thereof. Accordingly, the structure, command, control and arrangement of these conventional components have, for the most part, been illustrated in the drawings by readily understandable diagram representations and schematic diagrams. The drawings show only those specific details that are pertinent to the present invention in order not to obscure the disclosure with structural details that will be readily apparent to those skilled in the art having the benefit of the description herein. For example, the work-piece substrate 12, FIG. 1 is an inverted spa substrate fabricated from acrylic mounted onto a rotating platform 13. The substrate 12 may, if desired, be selected from a group consisting of acrylic, co-extruded ABS/acrylic or thermoformed bathtubs, sinks, shower stalls or signage. Thus, the top level diagram and the schematic diagram illustrations of the Figures do not necessarily represent the structural arrangement or intended work piece of the exemplary process, and are primarily intended to illustrate major work-pieces of the process in a convenient functional grouping whereby the present invention may be more readily understood.

Figure 3:
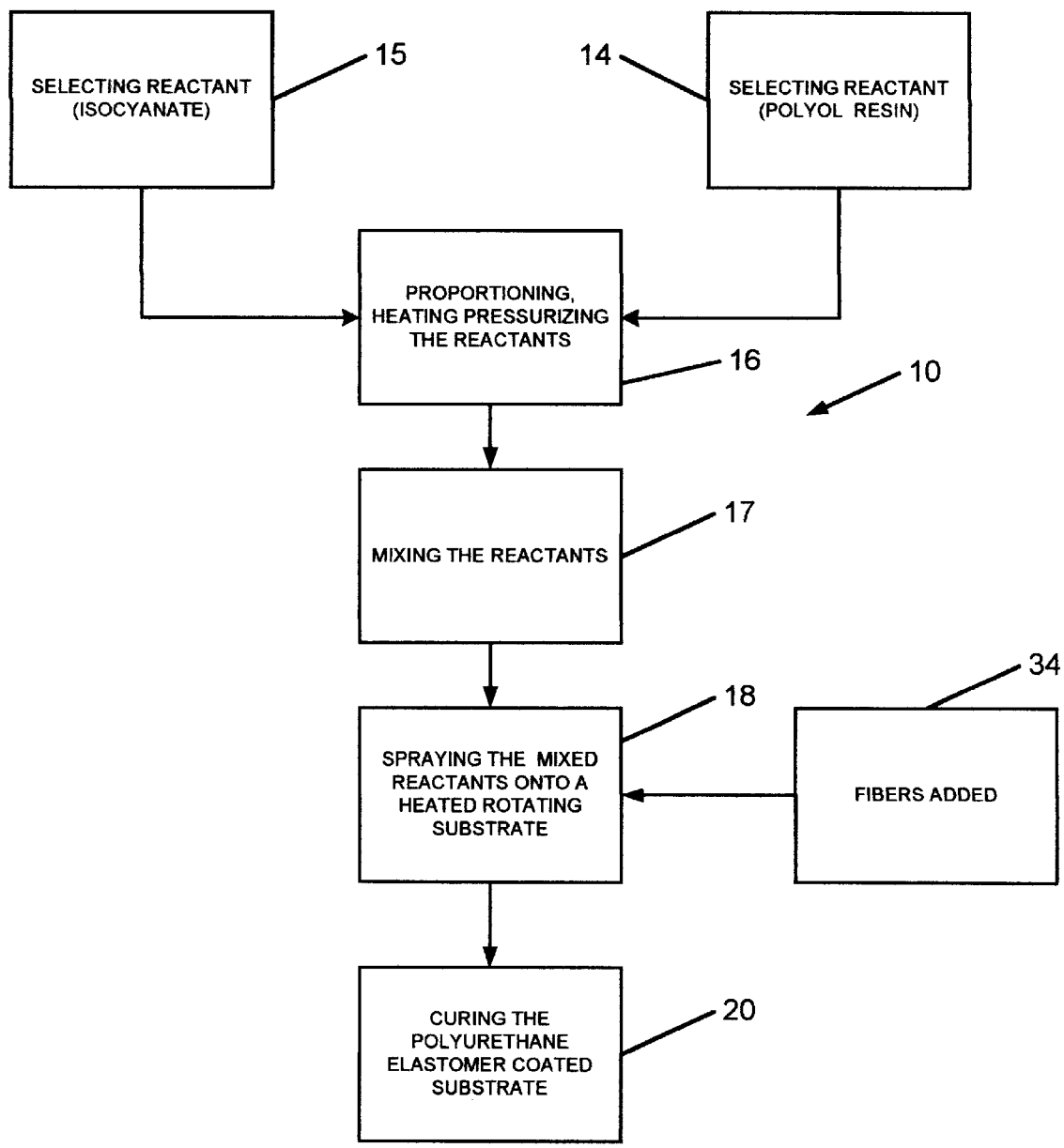
FIG. 3 illustrates a top level block diagram view of the preferred embodiment of the process of the present invention.
Figure 4:
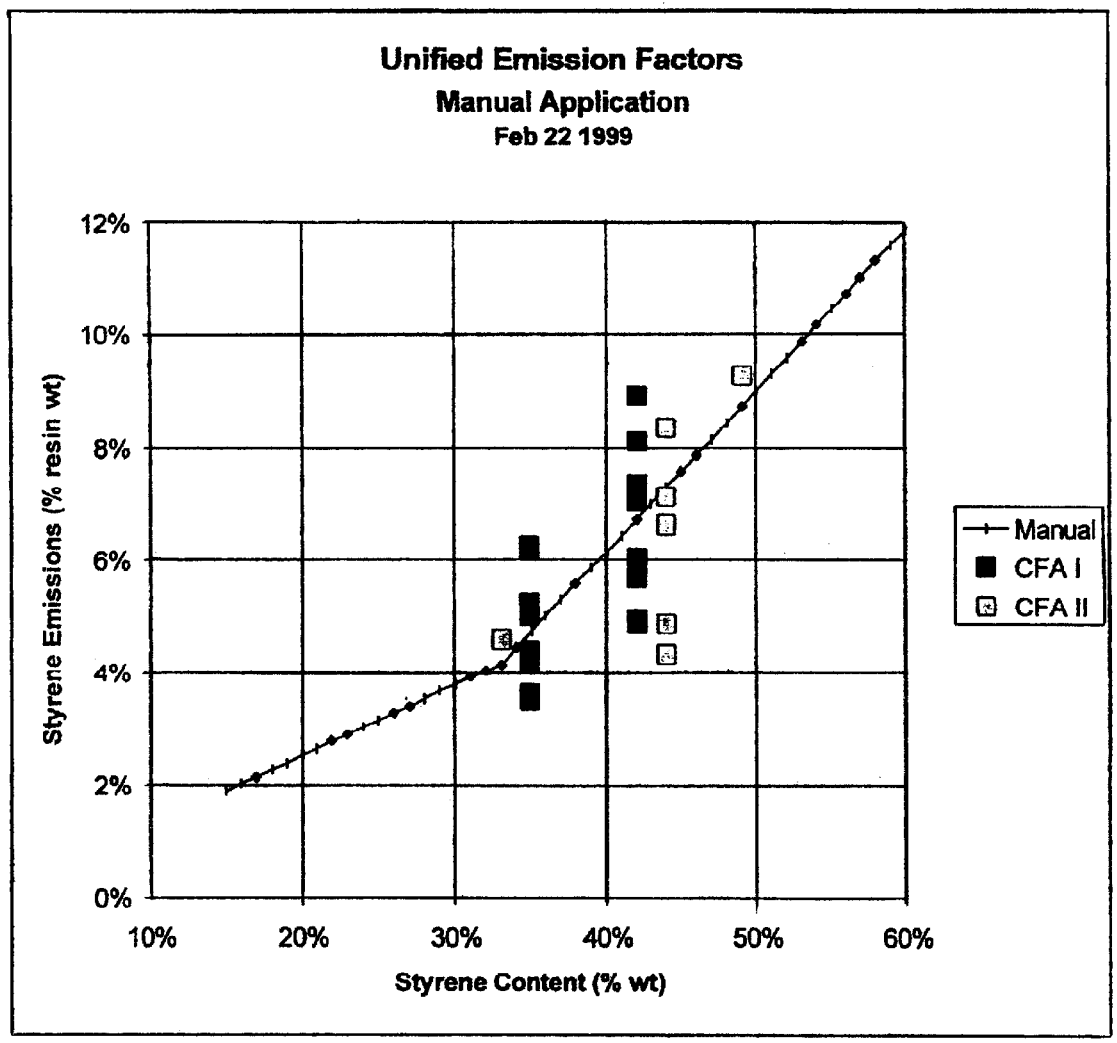
FIG. 4 illustrates a graph view of styrene emissions into the atmosphere.
Figure 5:
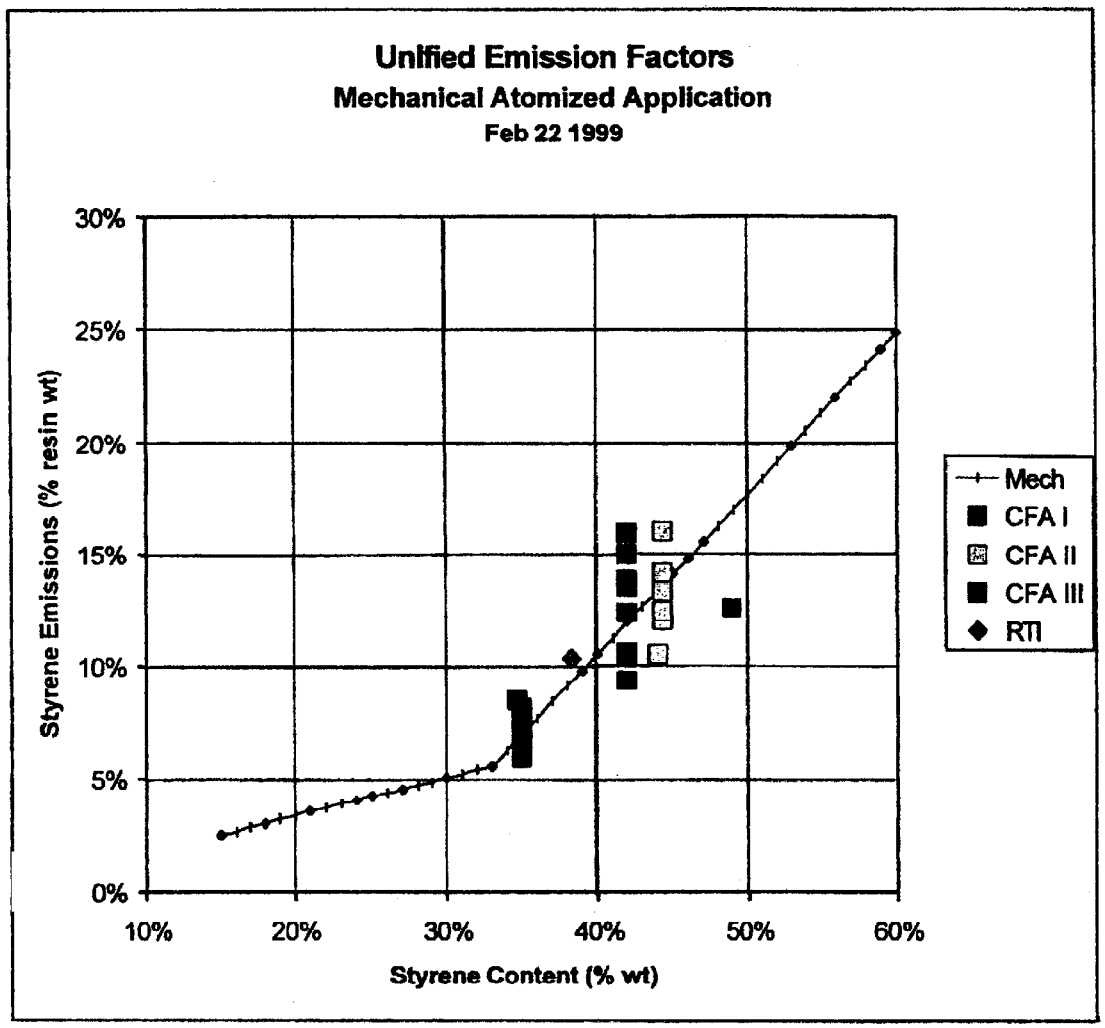
FIG. 5 illustrates a graph view of EPA mandates to control styrene emissions into the atmosphere.

An over view of the present invention 10, FIG. 3: The present invention 10 is a process for applying a polyurethane elastomer formulated from VOC-free reactants. The polyurethane is a two part formulation of a polyol resin reactant 14 and an isocyanate reactant 15. The reactants are separately proportioned, pressurized and heated 16 then the proportioned, pressurized and heated reactants are mixed together and applied to the substrate 17. The proportionate volume ratio of isocyanate reactant 15 to polyol resin reactant 14 is 1:1.05 to about 1:4. The combining of the reactants 14 and 15 initializes the formation of the polyurethane with a stoichiometric excess of the isocyanate reactant 15. The mixed polyurethane reactants 14 and 15 are sprayed 18 onto a heated rotating substrate in an amount sufficient to create a polyurethane elastomer reinforcement layer. The polyurethane reaction continues as the reactants are being sprayed onto the top surface of the rotating heated substrate 12, FIG. 1. The polyurethane reactants 14 and 15 polymerize or gel to form an elastomer 20 in the time range of 15 seconds to about 120 seconds. If desired, the spraying process 18 may be repeated thereby adding a plurality of layers to the elastomer coated top surface of substrate 12, FIG. 1 to create any desired thickness of polyurethane elastomer layer.

A more detailed discussion of the present invention 10, FIG. 3: A suitable substrate 12, FIG. 1 is selected from a group consisting of acrylic, co-extruded ABS/acrylic or thermoformed bathtubs, sinks, shower stalls, spas and signage. The substrate 12 is positioned on a platform 13 with the outer or "non-showing" surface of the substrate 12 facing upward as depicted in FIG. 1. The substrate 12 may, if desired, be secured to the platform 13 by any convenient securing mechanism. Examples of securing mechanism are clamps, vacuums or other retaining mechanisms. The substrate 12 is cleaned, dried, and free from oils, dust, dirt, etc. The process of cleaning entails wiping the outer surface of the substrate 12 with any convenient solvent. Examples of solvents are acetone, methyl-ethyl ketone and methanol.

The substrate 12, FIG. 1 is heated to a selected temperature such that the substrate is at a preselected temperature at the time of application of the polyurethane. The selected heating temperature of the substrate 12 is dependent of thermal properties of the substrate. Typically, the acrylic substrates, as discussed above, have a thermal deformation temperature of 110° F. to about 120° F. In view of the typical thermal deformation properties of the substrate 12, the selected heating temperature is heated to 90° F. to about 105° F. Preferably, the selected heating temperature of the substrate 12 is 95° F.

The polyurethane elastomer coated onto the outer surface of substrate 12, FIG. 1 is a two-part system; a selected polyol resin reactant 14 and a selected isocyanate reactant 15. The selected polyol resin reactant 14 may be any convenient polyol compound or polyol compound mixture having at least one constituent component containing at least two hydroxyl (—OH) groups. Examples of polyol compounds include, but are not limited to, glycerin, propylene glycol, ethylene glycol, polytetramethylene glycol and higher molecular weight reaction products of the above with ethylene oxide and/or propylene oxide. Other compounds that may be included in the polyol resin reactant include, but are not limited to, amine-containing (—$NH_x$) compounds such as diethylenetoluenediamine, polyalkylamines, and higher molecular weight reaction products of ethylenediamine, toluenediamine, and others with ethylene oxide and/or propylene oxide. Still other compounds that may be included in the polyol resin reactant mixture include catalysts, inert fillers, defoamers, fumed silica, and other compounds that are commonly available and well known to those skilled in the art. The selected isocyanate reactant 15 may be any convenient isocyanate compound having at least two isocyanate (—N=C=O) groups. Examples of useful isocyanate compounds are: methylene diphenyl diisocyanate (MDI), toluene diisocyanate (TDI), isophorone diisocyante (IPDI) and combinations of these and others commonly available and well known to those skilled in the art. Examples of well known manufacturers of the above-mentioned commonly-used polyols, amines, and isocyanates include, but are not limited to: Huntsman Polyurethanes, BASF AG, Bayer Corporation, and Dow Chemical.

A selected volume of polyol resin reactant 14 is poured into a holding tank 21, FIG. 1. A selected volume of isocyanate reactant 15 is poured into a holding tank 22. The holding tanks 21 and 22 may be any convenient size of vessel to retain the reactant 14 and 15, respectively. Examples of vessels range from 55 gallon drums to multiple thousand gallon storage tanks. The selected volume of polyol resin reactant 14 and isocyanate reactant 15 is derived from the production schedule for elastomer coated substrates i.e., the higher the production of elastomer-coated substrates the larger the selected volume of polyol resin reactant 14 and isocyanate reactant 15. Typically, 55-gallon drums are used to ship the polyol resin reactant 14 and isocyanate reactant 15.

The polyol resin reactant 14 and isocyanate reactant 15 are separately transferred from the holding tanks 21 and 22, FIG. 1 to the proportioning pump 23 by any convenient means consistent with the recommendations and specifications of the proportioning pump manufacturer. The proportioning pump 23 is set to deliver polyol resin reactant 14 and isocyanate reactant 15 at a selected volume ratio. Typically, the proportioned volume ratio of isocyanate reactant 15 to polyol resin reactant 14 is from 1:1.05 to 1:4. Preferably, the proportioned volume ratio of isocyanate reactant 15 to polyol resin reactant 14 is 1:2. The reactants flow from the proportioning pump 23, FIG. 1 to a heater 24 via two separate pressurized hoses (not shown). The proportioning pump 23 and the heater 24 may, if desired, be contained within the confines of a single housing 30. The proportion pump 23 delivers pressurized polyol resin reactant 14 and isocyanate reactant 15 at pressures of 500 to about 3000 psig to the heater 24. Preferably, the pressure developed by the proportioning pump 23 in each of the reactant's hoses to the heater 24 is 1000–1500 psig and remains at that pressure during the processing of polyol resin reactant 14 and isocyanate reactant 15. If desired chopped fibers may be introduced into the spray stream of the mixed reactants by any convenient means as the mixed reactants are being applied to the substrate 12. The chopped fibers further reinforce the work piece.

The heater 24, FIG. 1 separately heats the polyol resin reactant 14 and the isocyanate reactant 15 to a selected temperature between 110° F. and about 180° F. Preferably, the heater 24 separately heats the polyol resin reactant 14 and the isocyanate reactant 15 to 150° F. The heater 24 is connected to a spraying mechanism 25 via two separate pressurized and heated hoses 28 and 29. The two hoses 28 and 29 maintain the pressure and heat of the polyol resin reactant 14 and the isocyanate reactant 15 at the desired or selected settings. The proportioned, pressurized and heated polyol resin reactant 14 and the isocyanate reactant 15 are mixed within the confines of the spraying mechanism 25 wherein the initial reaction of the two reactants begins. The spraying mechanism 25 may, if desired, be manually operated or automated. The formulation of the polyurethane reactants and the processing thereof delineated herein remains the same whether the spraying mechanism is manually operated or automated.

The aforementioned proportioning pump 23, FIG. 1, heater 24 and spraying mechanism 25 equipment are well known within the polyurethane industry. Any convenient manufacture of proportioning pump, heater or spraying mechanism may be used to implement the present invention 10. Typical manufactures of proportioning pumps, heaters and spraying mechanisms in relation to the present invention 10 are Gusmer Corp., Binks and Graco. For example, the spraying mechanism 24 is the Binks Model 43P spray gun.

In operation, the present invention 10, FIG. 1 the substrate's 12 outer surface is cleaned by wiping with any convenient solvent. The substrate 12 may, if desired, be preheated to a temperature range of 90° F. to 105° F. before being placed on the platform 13. Preheating helps to facilitate adhesion of the polyurethane to the substrate 12. The substrate 12 is secured to the platform 13 wherein the temperature of the substrate is stabilized at the selected spraying temperature. The substrate 12, secured to the platform, begins to rotate. The polyol resin reactant 14 and the isocyanate reactant 15, FIG. 3 are selectively proportioned, pressurized and heated 16. The polyol resin reactant 14 and isocyanate reactant 15 are mixed 17 and, if desired, discontinuous or chopped fiber reinforcement 34 may be added to the mixture of polyol resin reactant 14 and isocyanate reactant 15. The mixture of polyol resin reactant 14 and isocyanate reactant 15 is sprayed 18 onto the rotating substrate 12 to a layer thickness of 1/16 inch to about ½ inch. Preferably, to a final layer thickness of ¼ inch. Multiple layers of varying thicknesses may, if desired, be sprayed 18 onto the substrate 12. Finally, the sprayed substrate 12 is cured 20 either on the platform 13 or removed from the platform 13 for further curing. The spraying 18 of the mixture of the polyol resin reactant 14 and isocyanate reactant 15 onto the substrate 12 and the polymerization or gelation process 20 is in the time range of 15 seconds to about 120 seconds. Preferably, the time range is 30 to 45 seconds. In the case of the present invention, the polymerization or gel time allows the part to be handled sooner after application of the reinforcement than in the case of polyester resin.

The initial reaction of the mixture of polyol resin reactant 14 and isocyanate reactant 15 begins in the spraying mechanism 25 FIG. 1 and continues as the mixture is sprayed and cured on the outer surface of the substrate 12. The mechanism for adhesion of the polyurethane elastomer to acrylic and ABS/acrylic substrates is the result of a combination of a plurality of factors. It should be noted the present invention 10 achieves adhesion of the polyurethane elastomer to the acrylic and ABS/acrylic substrates is without the use of adhesion-promoting additives to the polyol resin reactant or the isocyanate reactant 15 or a primer on the outer surface of the substrate 12. Principle factors of adhesion of the polyurethane elastomer to the substrate 12 include: the reaction of excess isocyanate groups with any pendant acrylic acid groups of substrate 12, electrostatic interaction of the polyurethane with the acrylic or ABS type substrates, and some of the excess isocyanate groups attached to the ends of long urethane chains (macromolecules) diffuse into the acrylic or ABS substrates. Another contributing factor in the adhesion of the polyurethane elastomer to the acrylic and ABS substrate is the temperature profile of the substrate and reaction allowing for more mobility of the polyurethane reactants and substrate. To determine the polyurethane elastomer adhesion strength to a substrate as delineated herein an adhesion test was conducted. The test was measured by ASTM test method D4541-95 and the adhesion of the polyurethane elastomer to the substrate was greater than 1500 psi.

The mechanisms for adhesion discussed above along with the various terms and definitions used herein to discuss various aspects of the of polyurethane adhesion to a substrate are delineated in; *Adhesion Aspects of Polymeric*

*Coatings*, Baghdachi, J. A.: Federation of Societies for Coatings Technology, 1996 and G. Woods, *The ICI polyurethanes Book*, 2nd edition, Chichester—N.Y., ICI Polyurethanes and John Wiley & Sons, 1990.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

I claim:

1. A process of applying a polyurethane, comprising the steps of:
    a) providing a substrate;
    b) heating said substrate to a selected temperature;
    c) selecting a polyol resin reactant;
    d) selecting an isocyanate reactant in a stoichiometric excess of said polyol resin reactant;
    e) mixing said reactants in a spraying mechanism;
    f) initiating reaction in said spraying mechanism effective to form a sprayable mixture of said reactants;
    g) forming a selected polyurethane from said reactants on the surface of said substrate to a selected thickness; and
    h) curing said selected polyurethane adhered to said substrate.

2. A process of applying a polyurethane as recited in claim 1 said step of heating wherein said selected temperature is 95° F. to about 110° F.

3. A process of applying a polyurethane as recited in claim 2 the step of selecting said isocyanate wherein the volume ratio of said isocyanate reactant to said polyol resin reactant is 1:1.05 to about 1:4.

4. A process of applying a polyurethane as recited in claim 3 the step of providing a substrate wherein said substrate is selected from the group consisting of acrylic, co-extruded ABS/acrylic or thermoformed bathtubs, sinks, shower stalls, spas and signage.

5. A process of applying a polyurethane as recited in claim 4 further comprising the step of rotating said substrate relative to said spray-head mechanism.

6. A process of applying a polyurethane as recited in claim 4 further comprising the step of rotating said spray-head mechanism relative to said substrate.

7. A process of applying a polyurethane as recited in claim 4 the step of spraying said mixed reactants wherein said selected layer thickness is $1/16^{th}$ inch to about ½ inch.

8. A process of applying a polyurethane as recited in claim 4 the step of spraying said mixed reactants wherein said selected layer thickness is $1/8^{th}$ inch.

9. A process for manufacture of a reinforced substrate wherein the substrate is selected from the group consisting of acrylic, co-extruded ABS/acrylic or thermoformed bathtubs, sinks, shower stalls, spas and signage, comprising the steps of:
    a) rotating a selected substrate;
    b) formulating polyurethane reactants to achieve a stoichiometric excess of isocyanate;
    c) spraying said formulated reactants onto said rotating selected substrate in an amount sufficient to create reinforcement of said selected substrate; and
    d) forming a polyurethane elastomer coating on said selected substrate via said polyurethane reactants;
    e) curing said polyurethane elastomer coated substrate.

10. A process for manufacture as recited in claim 9 further comprising the step of heating said rotating substrate to a selected temperature.

11. An improved process of applying a polyurethane to a substrate devoid of a surface primer, positioning the substrate on a rotating platform, mixing a polyol resin reactant and a isocyanate reactant, separately heating, proportioning, pressurizing and then mixing the reactants, applying the mixed reactants to the rotating substrate then curing the polyurethane elastomer adhered to the substrate wherein the improvement comprising:
    a) heating the rotating substrate to a selected temperature;
    b) selecting the isocyanate reactant in a stoichiometric excess of the polyol resin reactant; and
    c) spraying the separately heated, proportioned and pressurized mixture of said selected isocyanate and polyol reactants onto said selectively heated rotating substrate.

* * * * *

(12) EX PARTE REEXAMINATION CERTIFICATE (9023rd)
United States Patent
Banks

(10) Number: US 6,521,298 C1
(45) Certificate Issued: May 22, 2012

(54) PROCESS FOR APPLYING POLYURETHANE TO A SUBSTRATE

(75) Inventor: Eric W. Banks, Smyrna, GA (US)

(73) Assignee: Isotec International, Inc., Canton, GA (US)

Reexamination Request:
No. 90/009,289, Sep. 29, 2008

Reexamination Certificate for:
Patent No.: 6,521,298
Issued: Feb. 18, 2003
Appl. No.: 10/094,788
Filed: Mar. 11, 2002

Related U.S. Application Data

(60) Provisional application No. 60/274,963, filed on Mar. 12, 2001.

(51) Int. Cl.
*B05D 1/00* (2006.01)
*B05D 1/02* (2006.01)
*B05D 1/34* (2006.01)
*B05D 3/02* (2006.01)
*C08G 18/08* (2006.01)
*C08G 18/00* (2006.01)

(52) U.S. Cl. .................. 427/425; 427/422; 427/426; 427/427.3; 427/427.4; 427/427.6; 427/385.5

(58) Field of Classification Search ................... None
See application file for complete search history.

(56) References Cited

To view the complete listing of prior art documents cited during the proceeding for Reexamination Control Number 90/009,289, please refer to the USPTO's public Patent Application Information Retrieval (PAIR) system under the Display References tab.

*Primary Examiner*—Jerry D. Johnson

(57) ABSTRACT

The process for applying a polyurethane derived from VOC-free reactants wherein the reactants are polyol resin and isocyanate. The reactants are separately heated, proportioned and pressurized then the proportioned heated reactants are mixed together. The proportionate volume ratio of polyol resin reactant to isocyanate reactant is 1:1.05 to about 1:4. Combining the reactants initializes the formation of the polyurethane with a stoichiometric excess of the isocyanate reactant. The polyurethane reactants are sprayed onto a heated rotating substrate in an amount sufficient to create a polyurethane elastomer reinforcement layer after curing. The polyurethane reactants are polymerize or gel into an elastomer in the time range of 15 to about 120 seconds.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-11 are cancelled.

* * * * *